United States Patent
Smith-Whitley et al.

[11] Patent Number: 6,077,083
[45] Date of Patent: Jun. 20, 2000

[54] DOLL FOR INSTRUCTION OF SICKLE CELL DISEASE CLINICAL OBSERVATIONS

[75] Inventors: Kim Smith-Whitley, Philadelphia, Pa.; R. Michael Kennedy, Jr., Moorestown, N.J.

[73] Assignee: Children's Hospital of Philadelphia, Philadelphia, Pa.

[21] Appl. No.: 09/273,387

[22] Filed: Mar. 22, 1999

[51] Int. Cl.[7] .............................. G09B 23/28; A63H 3/00
[52] U.S. Cl. ..................... 434/262; 434/271; 434/272; 446/295; 446/296; 446/341
[58] Field of Search ................... 434/267, 270, 434/271, 272, 262; 446/295, 296, 341, 343

[56] References Cited

U.S. PATENT DOCUMENTS

| | | | |
|---|---|---|---|
| 1,937,397 | 8/1933 | Averill | 446/295 |
| 2,185,190 | 1/1940 | Gorbea | 446/295 |
| 2,678,505 | 5/1954 | Munson | 434/272 |
| 2,774,184 | 12/1956 | Hefferan | 446/295 |
| 3,106,785 | 10/1963 | Collins | 434/272 |
| 3,224,139 | 12/1965 | Reuge | 446/295 |
| 3,858,351 | 1/1975 | Porter | 446/296 |
| 4,075,782 | 2/1978 | Neuschatz | 446/295 |
| 4,209,939 | 7/1980 | Pittala | 446/295 |
| 4,227,338 | 10/1980 | Colquitt | 446/295 |
| 4,257,188 | 3/1981 | Barker | 446/295 |
| 4,288,222 | 9/1981 | Kling | 434/272 |
| 4,606,328 | 8/1986 | Thoman | 446/295 |
| 4,822,285 | 4/1989 | Summerville | 434/272 |
| 4,938,696 | 7/1990 | Foster | 434/272 |
| 4,944,681 | 7/1990 | Burgio | 434/270 |
| 5,037,302 | 8/1991 | Sirota | 434/236 |
| 5,061,188 | 10/1991 | McCollum | 434/272 |
| 5,312,287 | 5/1994 | Chuang | 446/295 |
| 5,356,295 | 10/1994 | Grosz | 434/272 |

OTHER PUBLICATIONS

Science News Letter, "Medical Doll" picture and caption, Jul. 1958.

*Primary Examiner*—Kien T. Nguyen
*Assistant Examiner*—Kurt Fernstrom
*Attorney, Agent, or Firm*—David G. Alexander; Arter & Hadden, LLP

[57] ABSTRACT

A medical teaching doll is provided with devices for simulating the differences between normal organs, and organs which are physically altered by sickle cell or other disease. The devices simulate the normal and diseased conditions so that the differences can be clearly seen and/or felt. The doll is used to train parents to recognize the signs or symptoms of sickle cell disease so that they may seek medical care for their children before they become more acutely ill. The signs or symptoms which are simulated by the doll include change of color of eye sclera, enlargement of spleen, elevated temperature, labored breathing and/-or coughing, and change of color of skin.

22 Claims, 15 Drawing Sheets

6,077,083

DOLL FOR INSTRUCTION OF SICKLE CELL DISEASE CLINICAL OBSERVATIONS

BACKGROUND OF THE INVENTION

1. Field of the Invention

The present invention generally relates to the field of public health, and more specifically to a doll for instruction in the clinical observations of sickle cell and other diseases.

2. Description of the Related Art

Sickle cell disease (SCD) is an inherited hemoglobin disorder. This disorder involves the destruction of red blood cells (hemolysis) and the blockage of small blood vessels (vaso-occlusion). Children with sickle cell disease are at risk for serious complications including 1) infections, 2) acute chest syndrome, 3) splenic sequestration, 4) aplastic anemia, 5) painful episodes, 6) stroke, 7) gallstones and gall bladder disease, 8) priapism, 9) increased hemolysis, and 10) dactylitis. Parents of children with sickle cell disease need to be aware of these numerous complications, so that they may seek medical care for their children before they become more acutely ill.

Studies have evaluated the incidence of splenic sequestration and its morbidity in Jamaican children with sickle cell disease. It was found that the incidence of splenic sequestration increased after teaching parents how to check their child's spleen size, and that mortality decreased because the parents brought their children to medical attention sooner.

Presently, education for the parent of a child with sickle cell disease is generally provided by a sickle cell disease nurse educator in an outpatient setting. Parents, care-givers, clinicians, guardians, and other concerned parties may be taught about the dangers associated with splenic sequestration as well as the importance of routinely checking the size of their child's spleen.

The correct procedure for accurately assessing spleen size on a pediatric patient however, can be difficult. Also, many children may not be experiencing splenic enlargement at the time their parents are learning how to check the spleen size.

Sickle cell disease is presently diagnosed through newborn screening in the majority of the states in the U.S. This has been instituted with the goal that by two months of age all children with sickle cell disease will be on penicillin prophylaxis. This means that educating the parents of a child with SCD usually beings within the first two months of a child's life.

However, penicillin prophylaxis does not prevent all bacteremic episodes, and therefore patients should be evaluated by a health care provider and receive prompt parenteral antibiotics when they develop high fevers. Parents need to know correct temperature-taking techniques so that they can seek medical care for elevated temperatures.

SUMMARY OF THE INVENTION

In accordance with the present invention, a medical teaching doll is provided with devices for simulating the differences between certain normal organs, and organs which are physically altered by sickle cell or other disease. The devices simulate the normal and diseased conditions so that the differences can be clearly seen and/or felt by laymen, parents.

The doll is used to train parents and care-givers to recognize the signs or symptoms of sickle cell disease so that they may seek medical care for their children before they become more acutely ill. The signs or symptoms which are simulated by the doll include change of color of eye sclera, enlargement of spleen, elevated temperature, and labored breathing and/or coughing.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
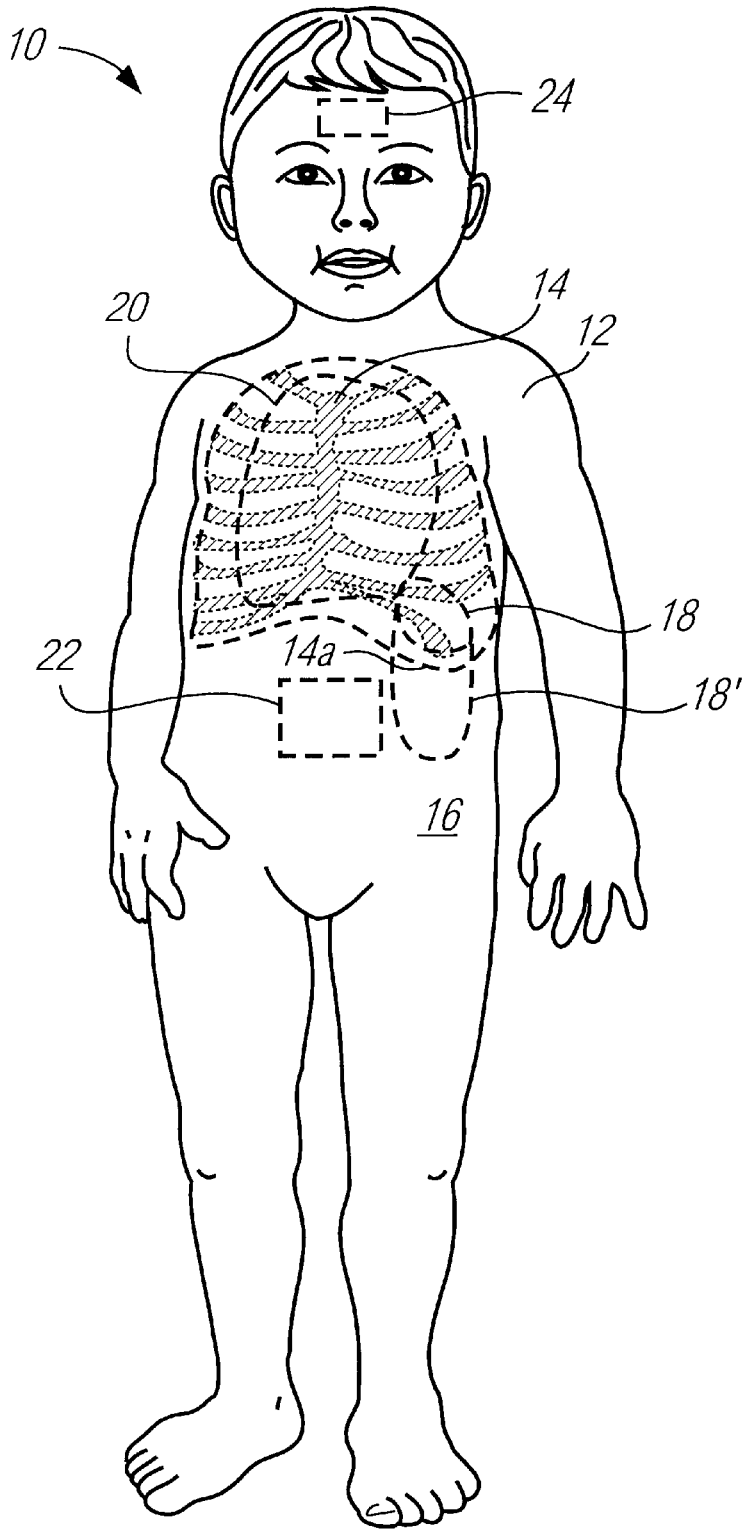
FIG. 1 is a diagram illustrating a doll according to the present invention for teaching signs or symptoms of sickle cell disease.

As illustrated in FIG. 1, a doll 10 for the instruction of sickle cell disease clinical observations according to the present invention includes a human shaped body 12, preferably representing an infant and/or child. The body 12 can be made of a plastic, rubber, or any other suitable material as is conventionally used in the manufacture of dolls for the toy industry.

Although the present invention will be described for a specific preferred embodiment of a doll for the instruction of clinical observations of sickle cell disease, it will be understood that the scope of the invention is not so limited, and further includes a doll which is capable of simulating symptoms for other blood and tropical diseases, such as any red cell disorders including malaria and thalassemia.

The doll 10 includes a simulated ribcage 14 which can be a generally planar member that is preferably formed with simulated raised ribs. It is not possible to provide the ribcage 14 with a distal portion, spine, etc. All that is required is a proximal surface having a left lower edge 14a.

At least a portion of the body 12 below the edge 14a is covered with a flexible, simulated skin surface 16 made of latex or the like. A simulated organ in the form of a spleen 18 is normally disposed beneath the ribcage 14. In a patient with sickle cell or other disease, the spleen 18 enlarges or is in an extended portion below the ribcage 14 as illustrated in the drawing at 18'.

The doll 10 further includes a simulated lung 20 which is supported beneath the ribcage 14 in the body 12. Symbolically illustrated in FIG. 1 is an actuator 22 for actuating the spleen 18 and lung 20 as will be described in detail below. Another actuator 24 is provided in the doll's head 26 for actuating the doll's eyes.

A major symptom of sickle cell disease is scleral icterus (change in color of the eyeball). In a normal person, the sclera is white. However, in many people suffering from sickle cell disease, the sclera changes color to various shades of yellow.

Figure 2:
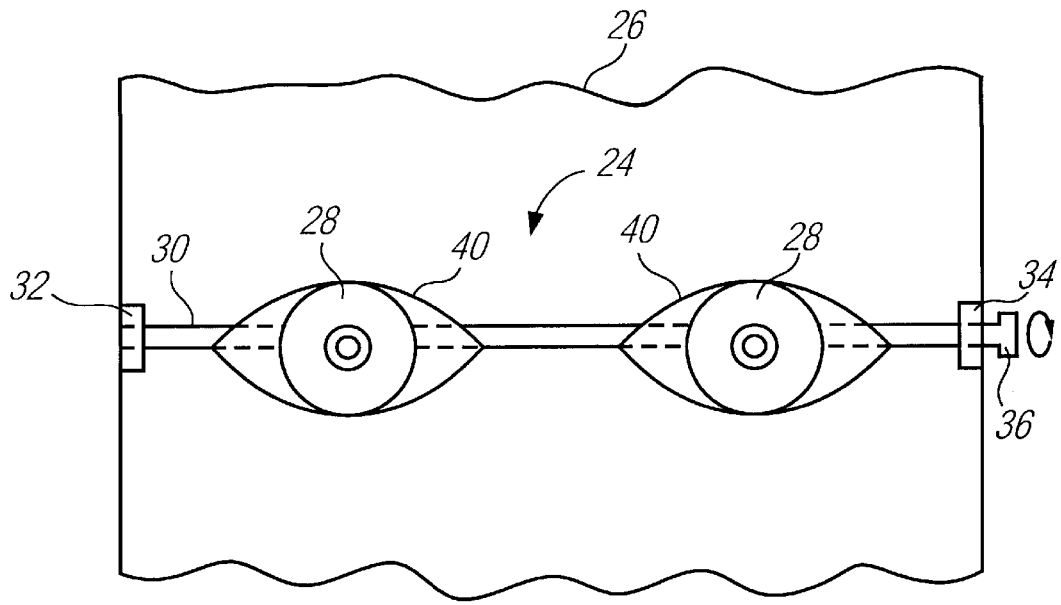
FIG. 2 is a diagram illustrating a device or arrangement for simulating change of eye sclera color.

The actuator 24 is configured to cause the doll's eyeballs 28 to simulate the normal and diseased conditions so that the differences can be clearly seen for teaching purposes. As illustrated in FIG. 2, the eyeballs 28 are mounted on a shaft 30 which is rotatably supported by bushings or bearings 32 and 34. The right end of the shaft 30 extends external of the head 26, and has a handle, crank, knob, or the like fixed thereto as indicated at 36.

The shaft 30, bearings 32,34 and knob 36 constitute a mechanical linkage for actuating the eyeballs 28. More specifically, rotating the knob 36 causes the shaft 30 and thereby the eyeballs 28 to rotate integrally therewith.

Figures 3A, 3B:
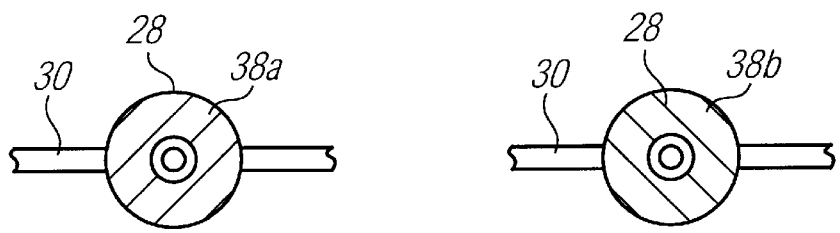
FIGS. 3a and 3b are diagrams illustrating normal and diseased eye color representations respectively.

As illustrated in FIGS. 3a and 3b, the eyeballs 28 each have a first pattern 38a formed on one surface thereof which represents a normal or healthy condition, and a second pattern 38b formed on a second surface thereof which represents a diseased condition (yellow sclera caused by sickle cell disease).

The surfaces 38a and 38b are rotatably displaced from each other on the eyeballs 28 by preferably 180° or 90° so as to be selectively exposed through the doll's eye sockets 40 depending on the rotational position of the knob 36. Assuming for example, that the surfaces 38a and 38b are on opposite sides of the eyeballs 28 (displaced by 180°), the normal sclera condition can be demonstrated by rotating the knob 36 until the normal patterns 38a are exposed through the sockets 40, and the diseased sclera condition can be demonstrated by rotating the knob 36 by 180° until the diseased patterns 38b are exposed through the sockets 40.

Figure 4:
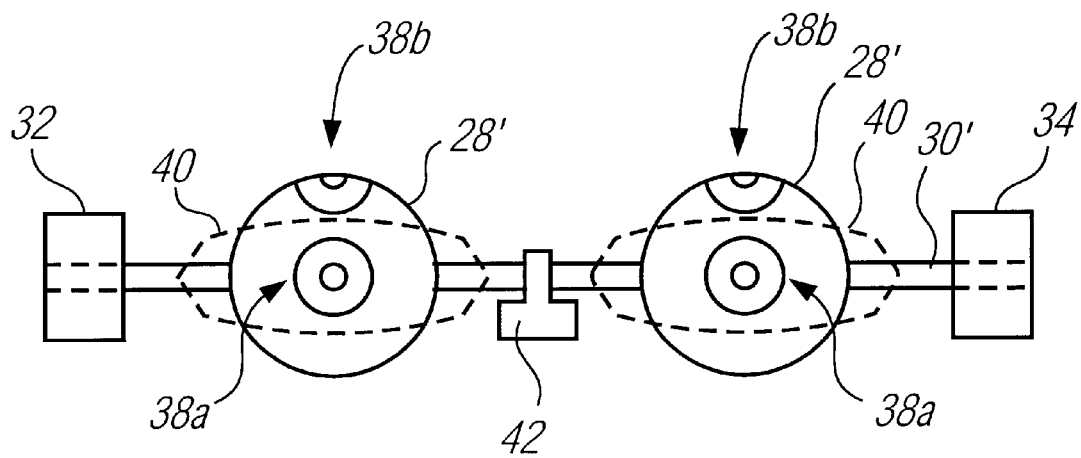

FIG. 4 illustrates an alternative actuator for actuating the eyeballs. Like elements are designated by the same reference numerals used in FIGS. 2, 3a and 3b, and corresponding but modified elements are designated by the same reference numerals primed.

In FIG. 4, the normal and diseased patterns 38a and 38b are displaced from each other by 90° on the eyeballs 28'. A weight 42 is fixed to the shaft 30'. Since the shaft 30' is rotatably mounted in the bearings 32,34, if the shaft 30' is maintained parallel to the ground, the weight 42 will always point downward, and the shaft 30' and eyeballs 28' will remain vertical or in the positions illustrated in FIG. 4 while the body is rotated therearound.

In the arrangement of FIG. 4, when the doll 10 is upright, the normal patterns 38a will be exposed through the sockets 40. When the doll 10 is laid down on its back, the diseased patterns 38b will be exposed. Although the weight 42 is shown as being attached to the shaft 30', the invention is not so limited, and weight 42 can be replaced by weights located in the lower portions of the eyeballs 28' as viewed in FIG. 4.

Figure 5:
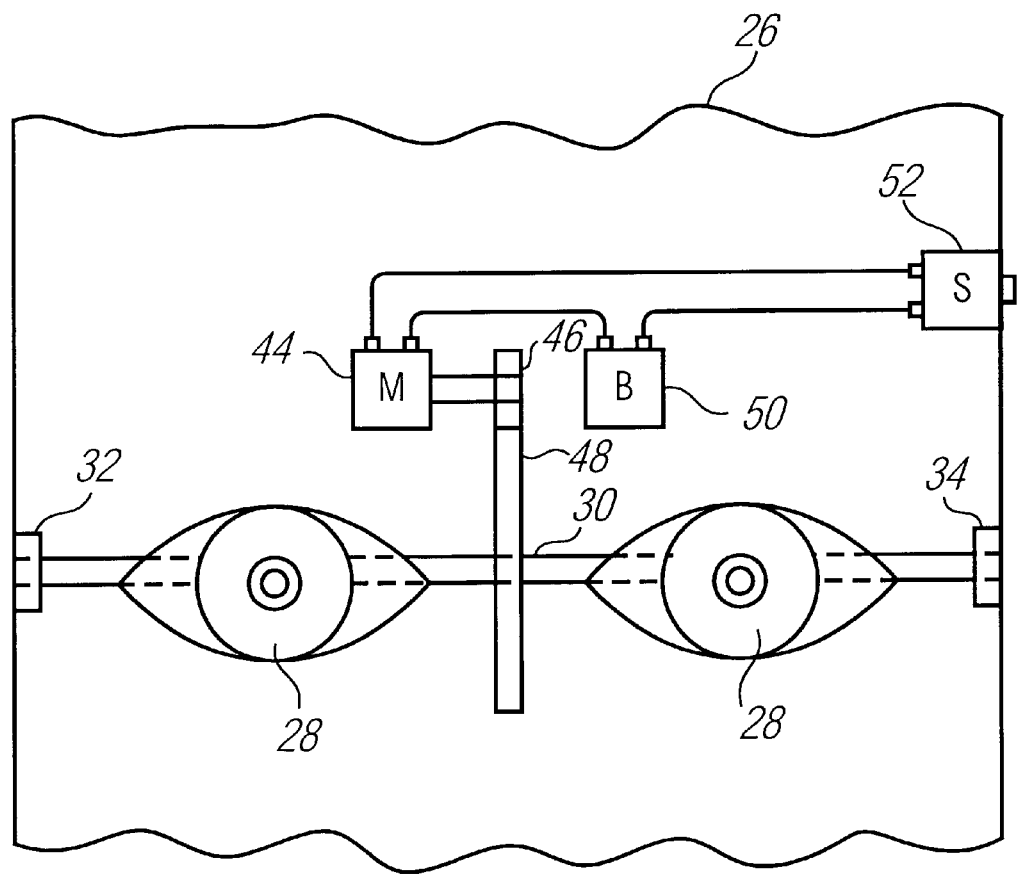

FIG. 5 illustrates another arrangement for rotating the eyeballs 28 between normal and diseased demonstration positions. In FIG. 5, the knob 36 is omitted, and the shaft 30 is rotated by an electric motor 44 via a drivetrain consisting of gears 46 and 48. The motor 44 is powered by a battery 50, and turned on or off via a switch 52 which is accessible from outside the body 12.

Figure 6:
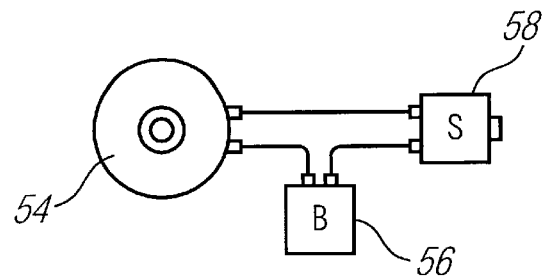
FIGS. 4 to 6 are diagrams illustrating alternative arrangements for simulating change of eye sclera color.

FIG. 6 illustrates another arrangement in which eyeballs 54 are fixedly mounted in the body 12 and constituted by optical displays such as liquid crystals arrays. The eyeballs 54 are designed to have a normal appearance with no electrical voltage applied thereto, and to present a diseased appearance upon voltage application. A voltage is selectively applied to the eyeballs 54 by a battery 56 and switch 58.

Other arrangements are possible within the scope of the present invention to provide eyeballs which demonstrate normal and diseased appearances. For example, the eyeballs can be painted to have a normal appearance. Then, a coating of thermographic or hydrographic paint or ink is applied to the eyeballs. Such paints and inks are commercially available.

In the case of the thermographic coating, the coating is normally transparent so that the eyeballs have the normal appearance. However, upon application of heat, the coating changes color to present the appearance of the diseased condition.

In the case of the hydrographic coating, the coating is normally transparent so that the eyeballs have the normal appearance. However, upon application of water or other liquid, the coating changes color to present the appearance of the diseased condition.

Thermographic and hydrographic coatings can also be applied to at least part of the exposed skin surface of the doll 10 to simulate normal and diseased skin conditions.

Figure 7:
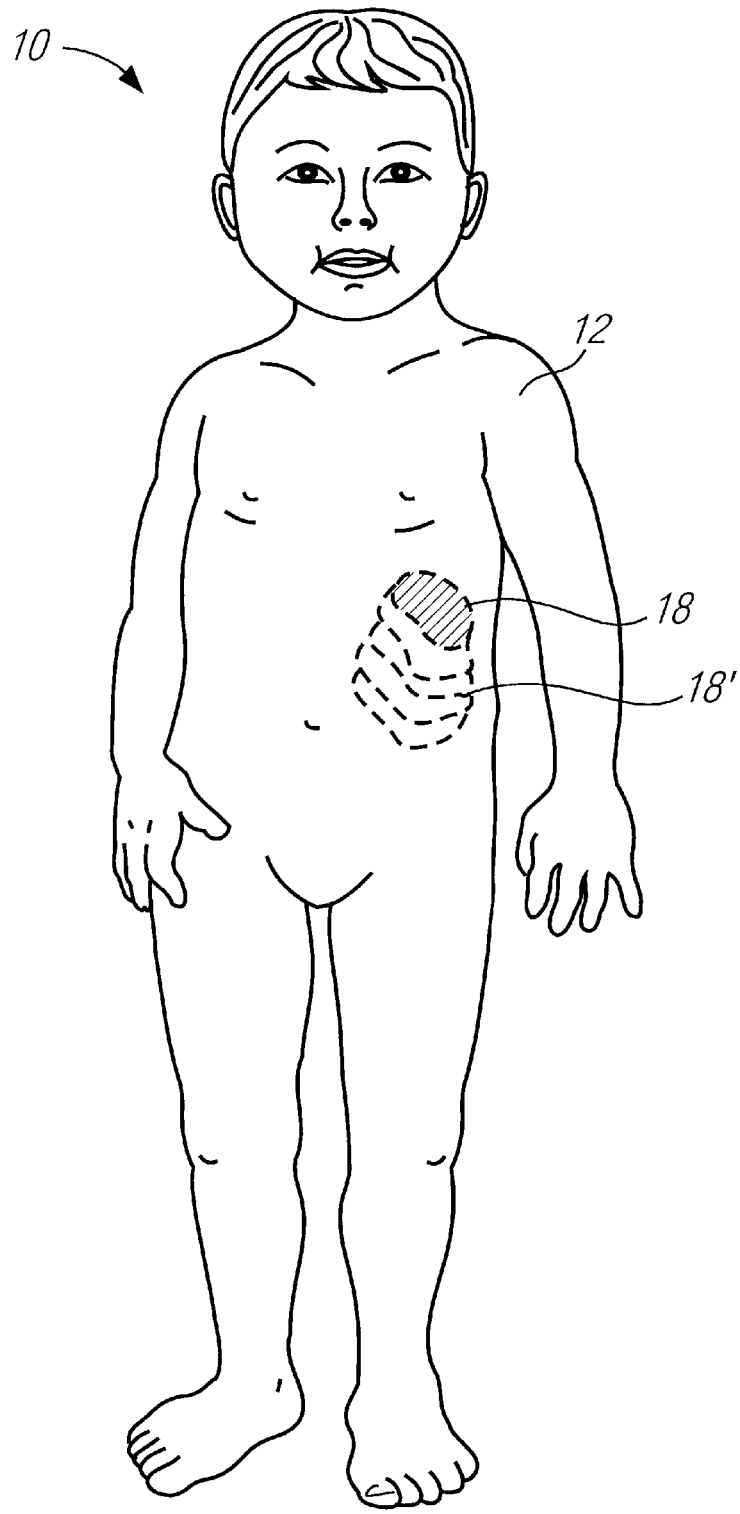
FIG. 7 is a diagram illustrating spleen enlargement caused by sickle cell disease.

FIG. 7 illustrates how the spleen 18 enlarges under the effects of sickle cell disease. As described above with reference to FIG. 1, the spleen 18 is normally small and covered by the ribcage 14 (not shown in FIG. 7). In certain patients with sickle cell disease, the spleen 18 expands downwardly so that part of it extends downwardly past the ribcage 14 and can be felt through the skin surface 16.

Figure 8:
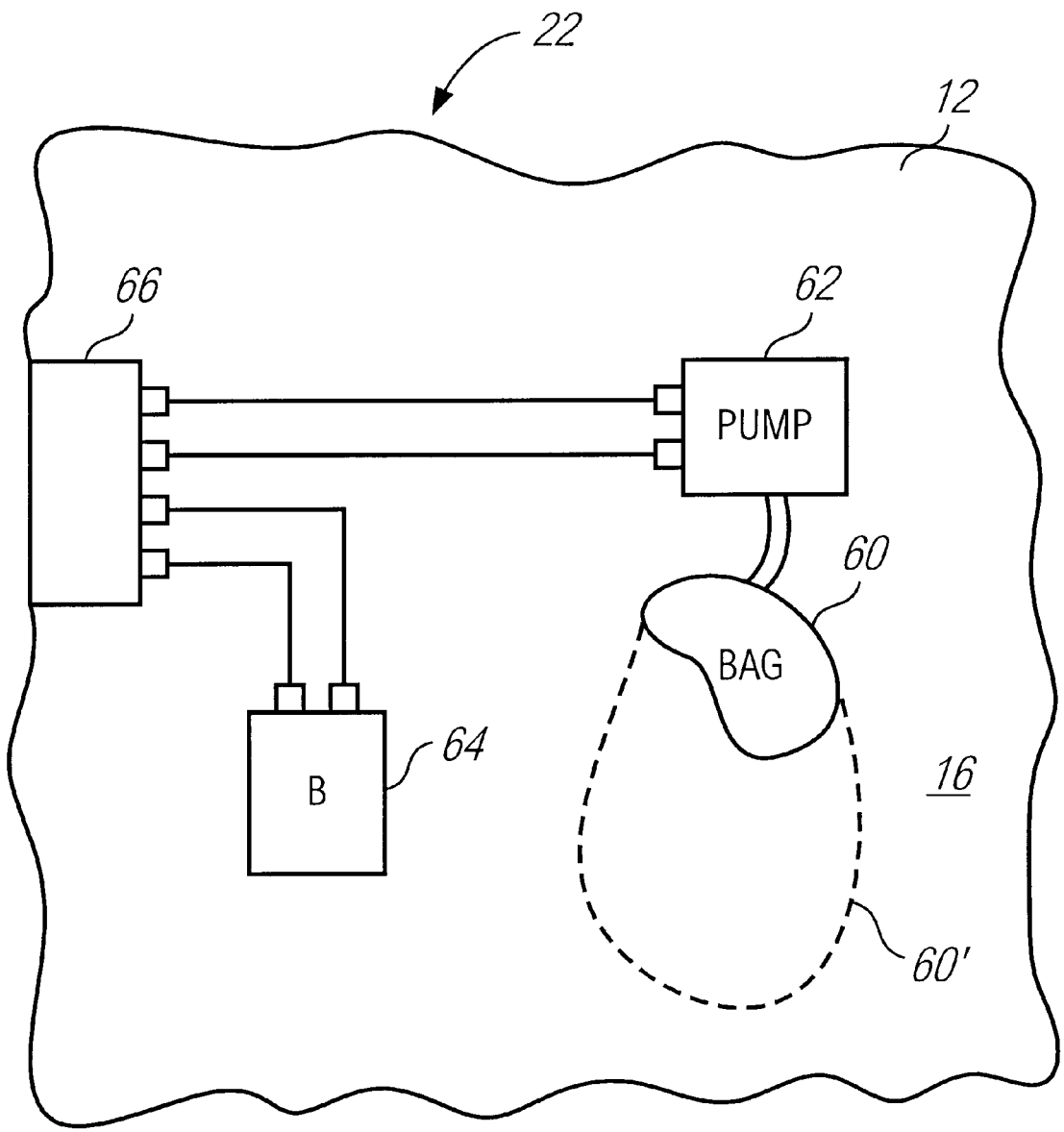
FIGS. 8 to 10, 11a, 11b, 12, 13a and 13b, 14a, 14b, 15a and 15b are diagrams illustrating alternative arrangements for simulating spleen enlargement.

FIG. 8 illustrates a first arrangement of the actuator 22 for actuating the spleen 18 to demonstrate normal and diseased conditions. The spleen 18 is simulated by a resilient bag 60 made of plastic, foam, rubber or the like. The bag 60 is fixed to the body 12 at its upper end, and is selectively inflated and deflated by an electric pump 62 via a battery 64 and switch 66.

The switch 66 is preferably a three position, reversing switch. In the center position, the switch 66 disconnects the pump from the battery 64. In one active position, the switch 66 connects the pump 62 to the battery 64 with a polarity such that the pump 62 is driven to pump air or liquid into the bag 60. This causes the bag 60 to expand to an inflated position as indicated at 60' in which the lower portion of the bag 60 extends below the lower edge of the ribcage 14 as further illustrated in FIG. 1. When the bag 60 has reached the desired inflated position, the switch 66 is moved to the center position to deactivate the pump 62.

In the inflated position, the lower portion of the bag 60 can be felt through the skin surface 16, thereby simulating an actual extended spleen. The bag 60 is returned to the normal position in which it is deflated and covered by the ribcage 14 by moving the switch 66 to the other active position. This connects the pump 62 to the battery 64 with the opposite polarity, and activates the pump 62 to pump air out of the bag 60 and cause the bag 60 to deflate. The switch 64 is moved to the center inactive position when the bag 60 has been suitably deflated.

Figure 9:
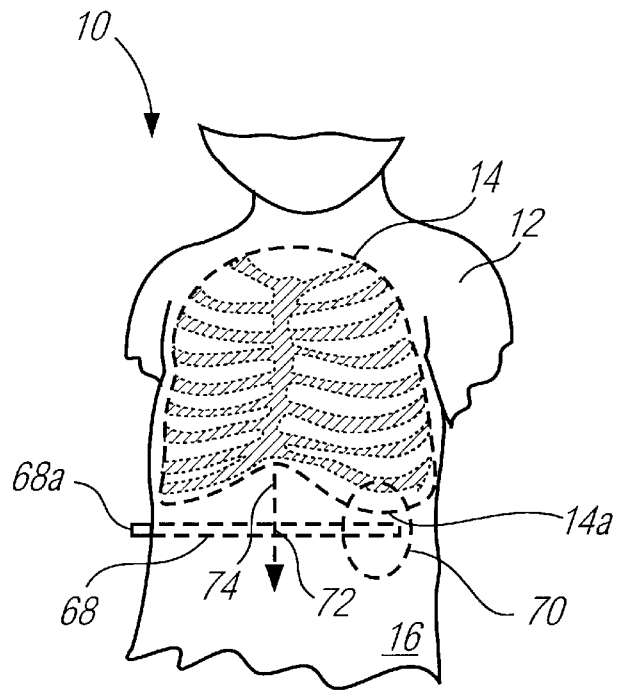

FIG. 9 illustrates another arrangement for moving a simulated spleen to represent normal and diseased conditions. The key to this embodiment is that the portion of the spleen 18 beneath the ribcage 14 cannot be felt, and all that is required to simulate a diseased spleen is an object of suitable firmness that can be felt through the skin surface 16 below the lower edge 14a of the ribcage 14.

FIG. 9 shows a lever arm 68 which constitutes part of a mechanical linkage, and has a simulated spleen 70 fixed to the right end thereof as viewed in the drawing. The spleen 70 is made of a semi-resilient material such as plastic or rubber.

The arm 68 is pivotal about an intermediate pivot axis as indicated at 72. The axis 72 extends perpendicular to the plane of the drawing. However, in another embodiment of the present invention, the pivot axis can extend parallel to the plane of the drawing at indicated at 74.

Figure 10:
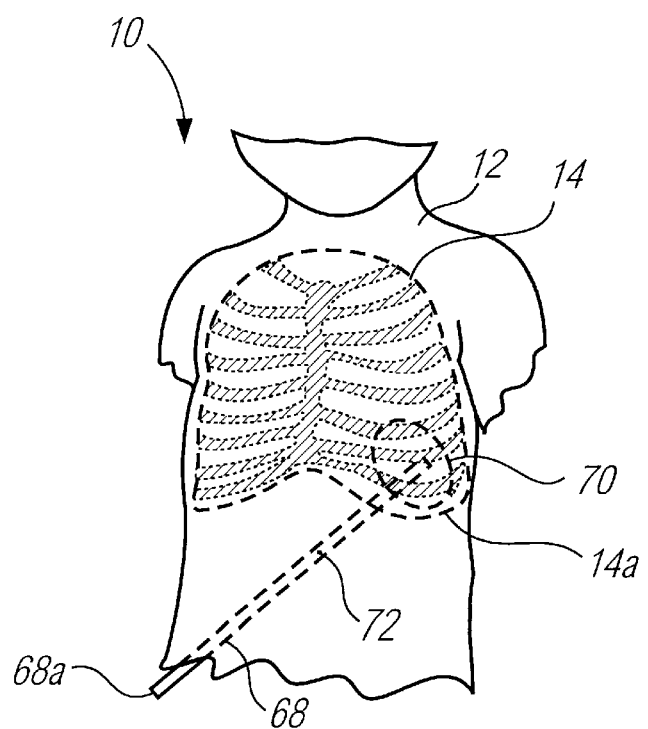

FIG. 10 illustrates the case in which the pivot axis 72 extends perpendicular to the plane of the drawing. This enables the arm 68 to pivot parallel to the plane of the drawing. The arm 68 is pivoted by grasping its left end 68a which is accessible from external of the body 12.

In FIG. 9, the arm 68 is rotated to a position in which the spleen 70 protrudes below the ribcage 14 to simulate the diseased condition. It is not necessary that a portion of the spleen 70 extend to the upper extent of the actual normal position, because any portions of the spleen 70 which are beneath the ribcage 14 cannot be felt.

The spleen 70 is moved to a normal position in which it is covered by the ribcage 14 by rotating the arm 68 counterclockwise from the position of FIG. 9 to the position of FIG. 10.

Figure 11A:
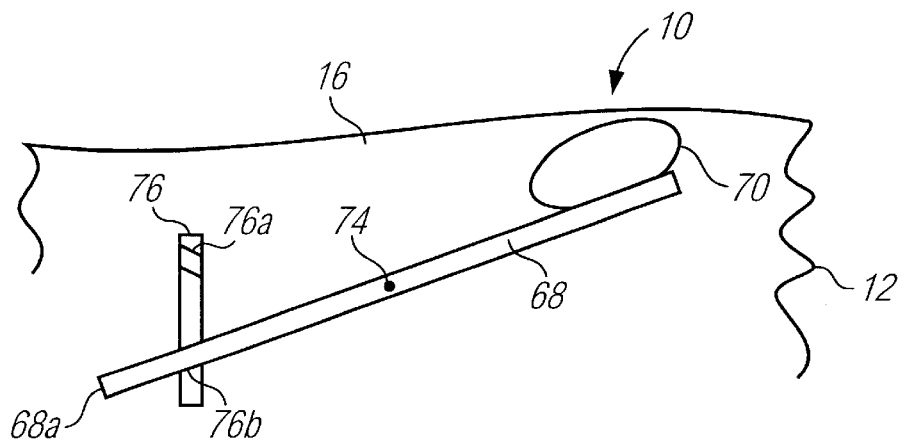
Figure 11B:
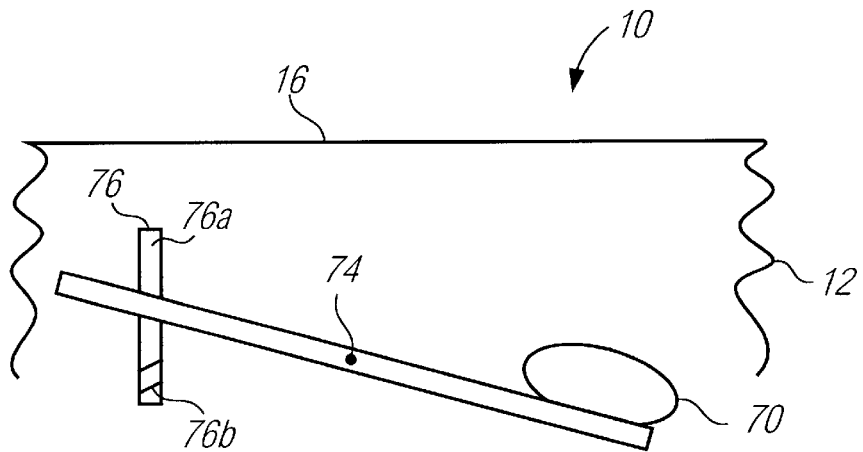

FIGS. 11a and 11b illustrate the arrangement in which the arm 68 is pivotal about the axis 74 as viewed in FIG. 9. FIGS. 11a and 11b are rotated by 90° from the orientation of FIG. 9 such that the doll is viewed from its feet.

In FIG. 11a, the lever arm 68 is rotated counterclockwise to a position at which the spleen 70 is able to be felt under the ribcage 14 to represent the diseased condition. In FIG. 11b, the lever arm 68 is rotated clockwise from the position of FIG. 11a, so that the spleen 70 is further under the ribcage than it is in FIG. 11a. In FIG. 11b, the spleen 70 cannot be felt below the ribcage 16, and thereby represents the normal condition.

Figure 12:
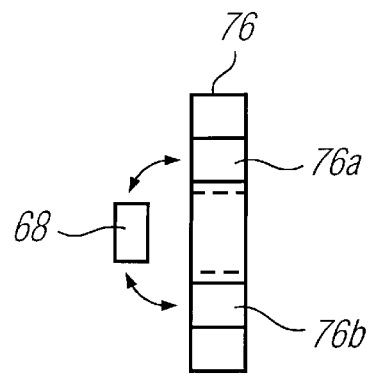

FIGS. 11a, 11b and 12 further illustrate a latch member 76 for latching the lever arm 68 in a selected one of the positions of FIGS. 11a and 11b. The latch member 76 comprises a block which is supported by the body 12, and is formed with angled notches 76a and 76b for receiving the lever arm 68 in the positions of FIGS. 11b and 11a respectively.

The pivot axis 74 is embodied as a pin which fits in a hole in the lever arm 68 with sufficient slack that the arm 68 can be moved laterally relative to the latch member 76 and inserted into a selected one of the notches 76a and 76b as illustrated in FIG. 12.

It is further within the scope of the invention to form the latch member 76 of a resilient material, with the notches 76a and 76b being slightly smaller than the latch member 76 to enhance the holding force. It is further possible to make the notches 76a and 76b perpendicular to the body of the latch member 76, rather than angled, so that the walls defining the notches 76a and 76b are resiliently deformed by the lever arm 68 to further enhance the holding force.

Figure 13A:
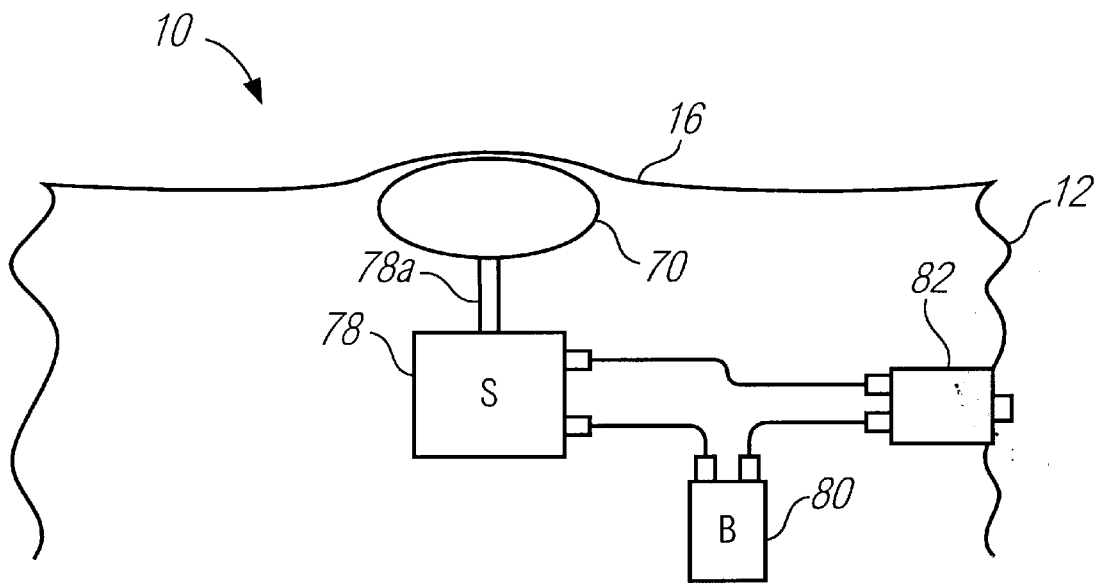
Figure 13B:
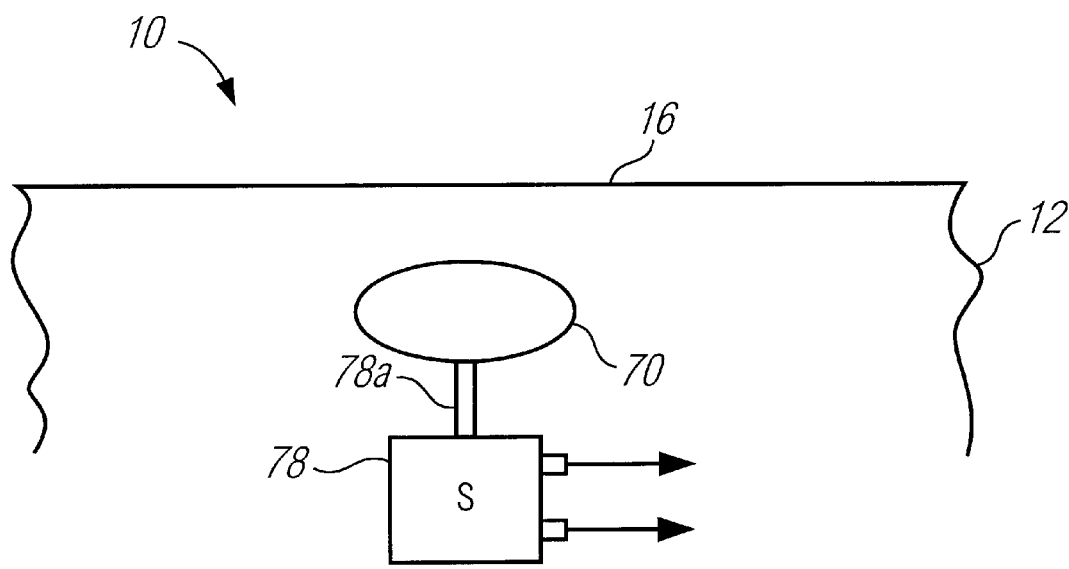

FIGS. 13a and 13b illustrate another actuator for moving the spleen 70 between a diseased position near to or touching the skin surface 16 as illustrated in FIG. 13a, and a normal position which is farther from the skin surface 16 as illustrated in FIG. 13b.

The actuator comprises a linear motor or solenoid 78 which is actuated by a battery 80 via a switch 82. The solenoid 78 includes a plunger 78a which has the spleen 70 attached to its end. The plunger 78a is normally in a retracted position as illustrated in FIG. 13b with the switch 82 open to represent the normal condition. When electrical power is applied to the solenoid 78 by closing the switch 82, the plunger 78a is extended to the position of FIG. 13a to represent the diseased condition.

Figure 14A:
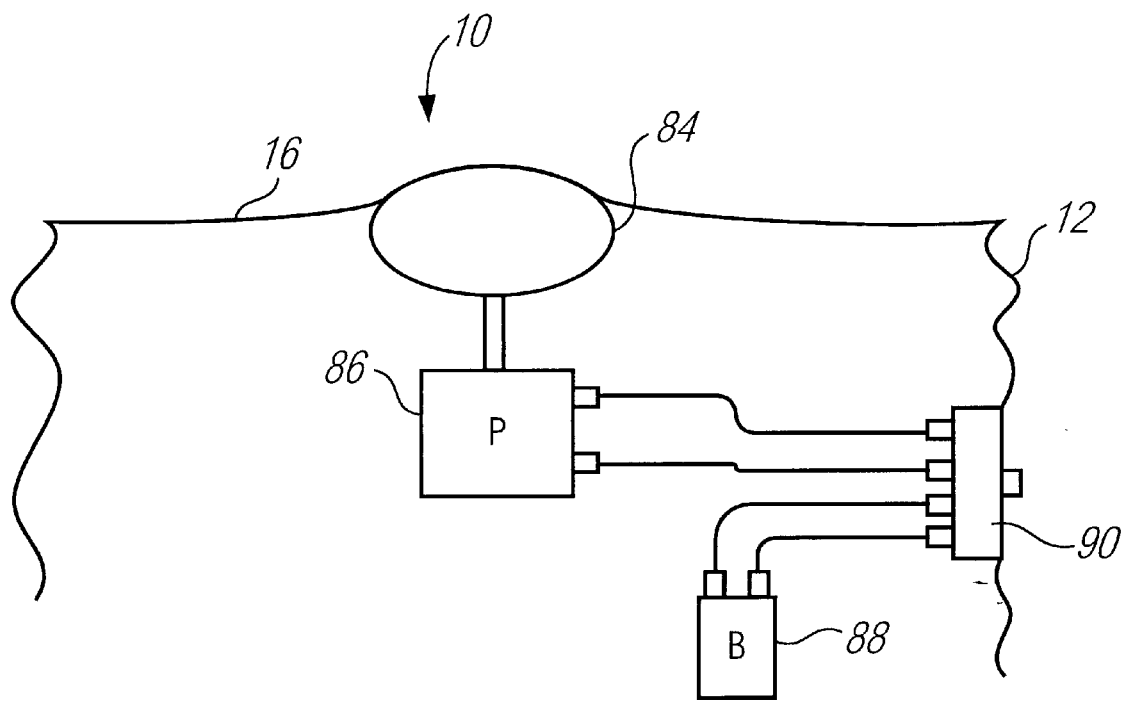
Figure 14B:
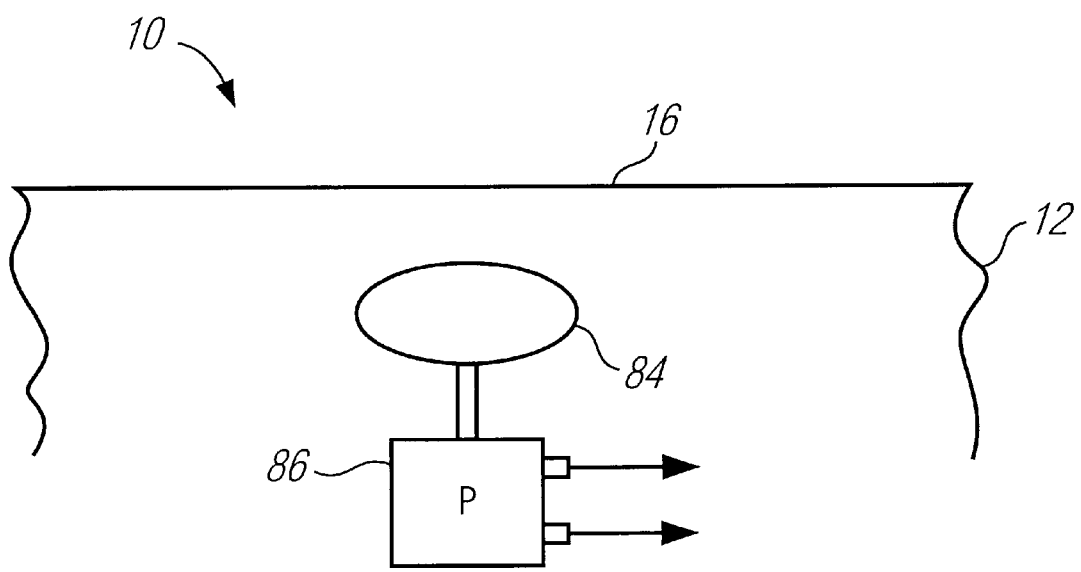

FIGS. 14a and 14b illustrate another arrangement for actuating a spleen which is simulated by a bag 84 that is supported by the body 12. The bag 84 is selectively inflated as illustrated in FIG. 14a to represent the diseased condition, or deflated as illustrated in FIG. 14b to represent the normal condition. The bag 84 is inflated and deflated using a pump 86, battery 88 and switch 90 in an arrangement which is essentially similar to that described above with reference to FIG. 8.

Figure 15A:
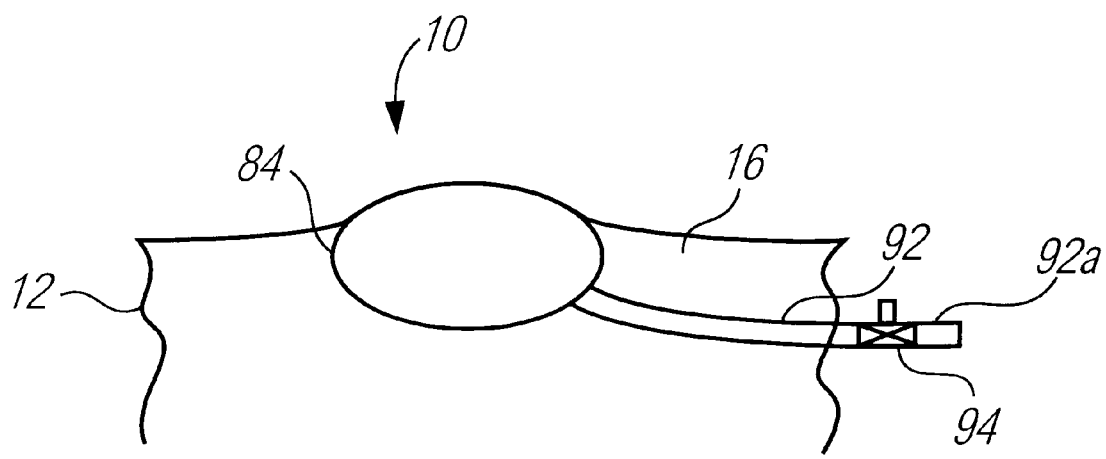
Figure 15B:
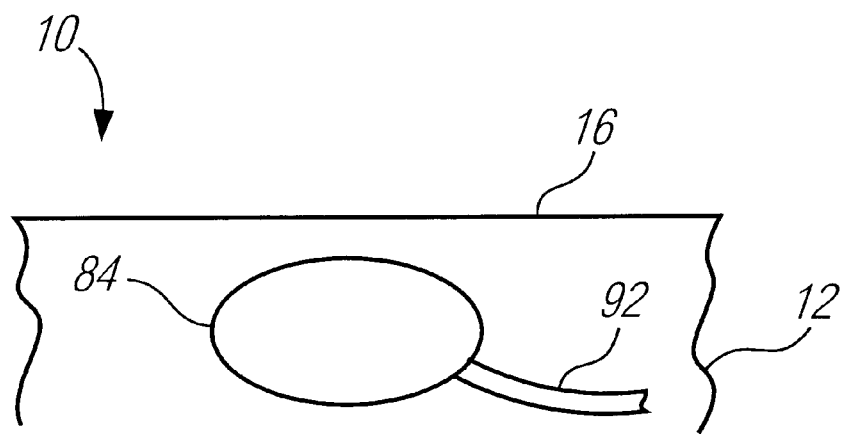

A simpler arrangement is illustrated in FIGS. 15a and 15b, in which the pump 86, battery 88 and switch 90 are replaced by a tube 92 having one end attached to the bag 84, and another end 92a which protrudes external of the body 12. A manual valve 94 is provided in the tube 92.

The bag 84 is inflated as illustrated in FIG. 15a by manually blowing air into the end 92a of the tube 92, and closing the valve 94 when the desired degree of inflation has been achieved to provide the diseased condition as illustrated in FIG. 15a. The normal condition as illustrated in FIG. 15b is achieved by opening the valve 94 and allowing the bag 84 to deflate by the escape of air therefrom through the tube 92.

Figure 16:
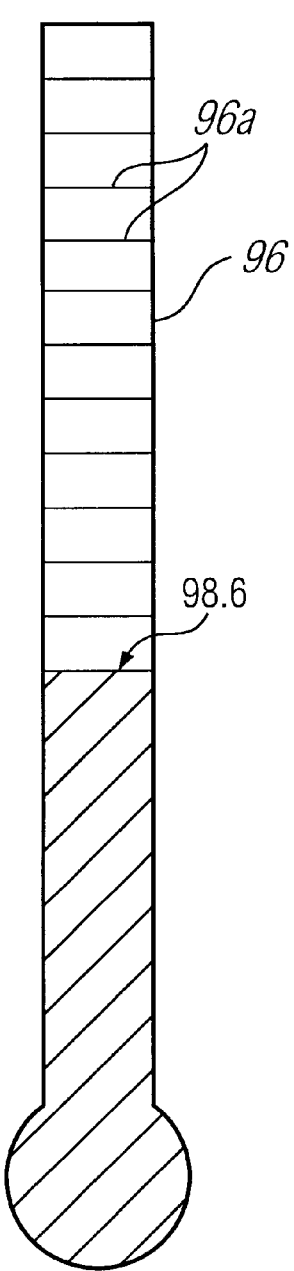
FIGS. 16 and 17 are diagrams illustrating dummy thermometers for simulating elevated temperature measurement.
Figure 17:
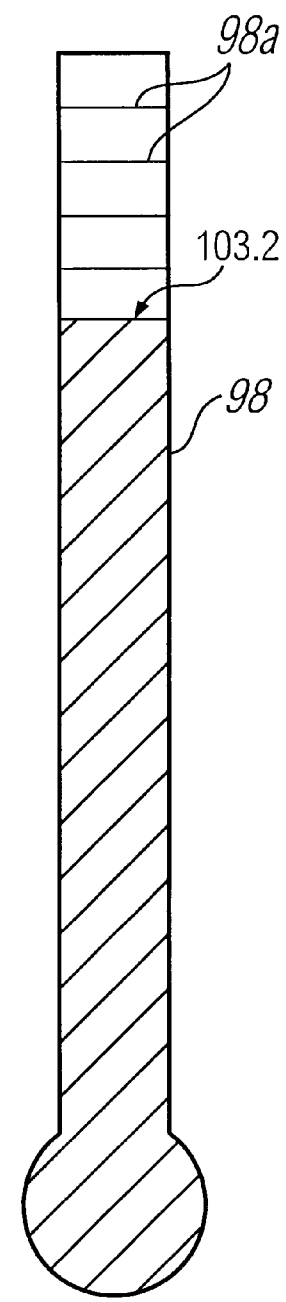

FIGS. 16 and 17 illustrate an arrangement for simulating normal and elevated body temperatures. As described above, an elevated temperature is one symptom of sickle cell disease.

The arrangement comprises two dummy thermometers 96 and 98 which are illustrated in FIGS. 16 and 17 respectively. The thermometer 96 is formed with temperature indicating graduations 96a, and is painted or otherwise marked to permanently present a normal temperature reading of approximately 98.6° F. The thermometer 98 has similar graduations 98a, and is marked to permanently present an elevated temperature reading of, for example, any temperature above normal.

The thermometers 96 and 98 are used to simulate the normal and elevated temperatures by holding them in contact with a skin surface from which temperature is normally taken. The skin surface can be an orifice (mouth, ear or anus), or another surface such as under the armpit.

Figure 18:
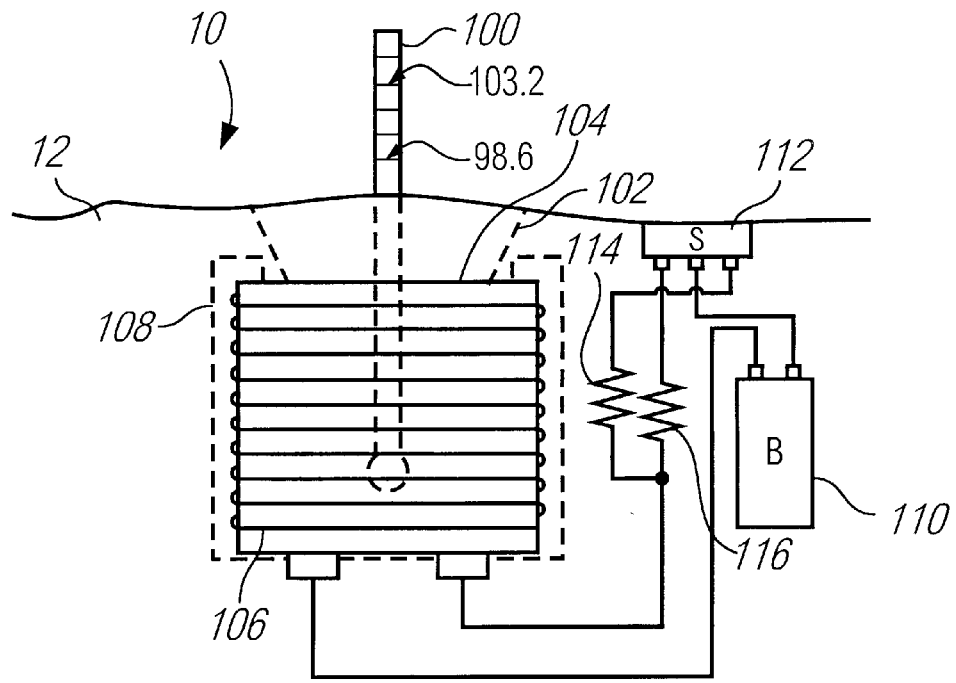
FIG. 18 is a diagram illustrating an arrangement for simulating elevated temperature measurement.
Figure 19:
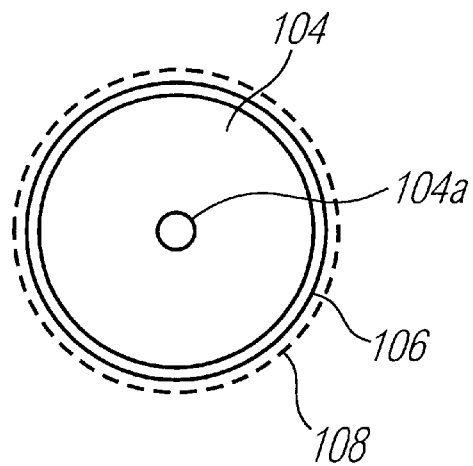
FIG. 19 is a plan view illustrating an electrical heater of the arrangement of FIG. 18.

FIGS. 18 and 19 illustrate another arrangement for simulating normal and elevated temperatures. In this embodiment of the invention, a conventional thermometer 100 is inserted into an orifice (mouth or anus) in the body 12 of the doll 10.

A heater core 104 is supported inside the orifice 102 and formed with a slit or hole 104a into which the temperature sensing end of the thermometer 10 is inserted. The core 104 is formed of a plastic or other suitable thermally conductive material. An electrical heater coil 106 is wound around the core 104. An optional thermally insulating cover 108 can be formed over the coil 106 and core 104.

Electrical current is supplied to the coil 106 via a battery 110, switch 112, and resistors 114 and 116. The switch 112 is a three position device with a center inactive position, and two active positions. In the center position, the coil 106 is disconnected from the battery 110.

In one active position of the switch 112, the battery 110 is connected to the coil 106 through the resistor 114, which has a value selected such that the coil 106 will heat the core 104 to a normal body temperature of 98.6° F. In the other active position of the switch 112, the battery 110 is connected to the coil 106 through the resistor 116, which has a value selected that the coil 106 will heat the core 104 to an elevated temperature of, for example, 103.2° F.

Figure 20:
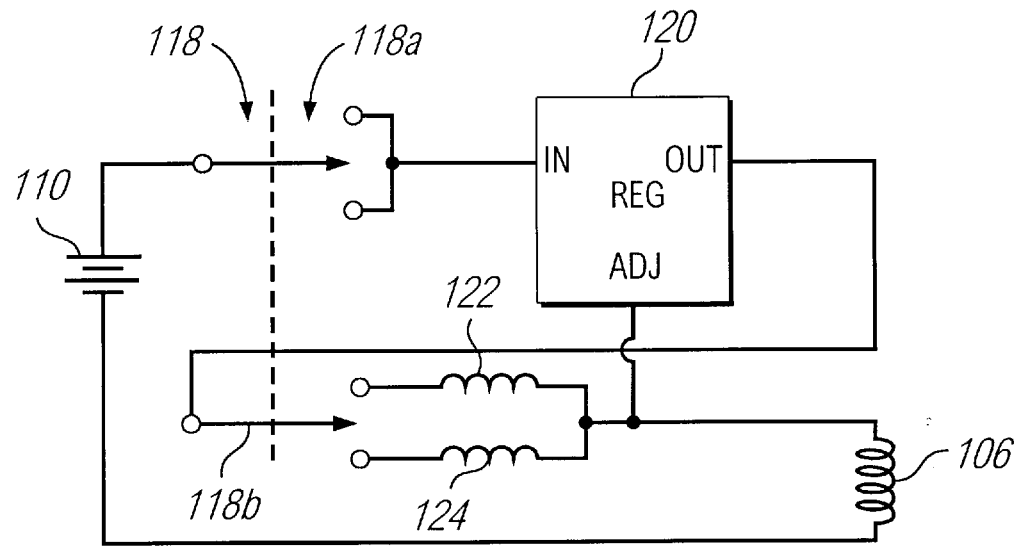
FIGS. 20 and 21 are electrical schematic diagrams illustrating alternative drive circuit for the heater of FIG. 19.

FIG. 20 illustrates an alternative electrical circuit for applying electrical current to the coil 106 such that more precise temperature control can be achieved. A switch 118 is a tandem unit having a first section 118a and a second section 118b, each of which has a center inactive position and two active positions.

In the inactive position of the switch 118, the battery 110 is disconnected from the coil 106. In both active positions, the first section 118a connects the positive terminal of the battery 110 to an input terminal IN of an integrated circuit voltage regulator 120, preferably an LM317 device.

The negative terminal of the battery 110 is connected through the coil 106 to a voltage adjustment terminal ADJ of the regulator 120. The terminal ADJ is further connected through resistors 122 and 124 to the active terminals of the second section 118b of the switch 118. An output terminal OUT of the regulator 120 is connected to the input terminal of the second section 118b of the switch 118.

The circuit of FIG. 20 is configured to function as a constant current source. In one active position of the switch 118, the output terminal OUT of the regulator 120 is connected through the second section of the switch 118b and the resistor 122 to the adjustment terminal ADJ of the regulator 120, and also to the coil 106. In the other active position of the switch 118, the output terminal OUT is connected through the second section 118b of the switch 118 and the resistor 124 to the coil 106.

The values of the resistors 122 and 124 are selected so that the current supplied to the coil 106 in the two active positions of the switch 118 produces normal and elevated temperature readings on the thermometer 100 as described above.

Figure 21:
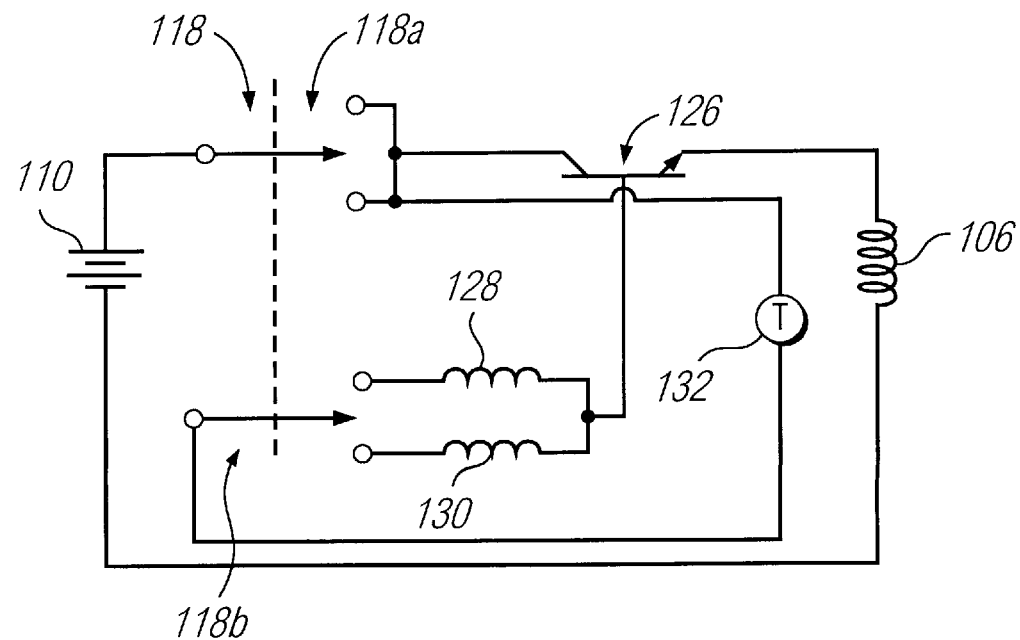

FIG. 21 illustrates another circuit for producing precisely controlled temperature readings on the thermometer 100. Whereas the circuits of FIGS. 18 and 21 are open loop arrangements, the circuit of FIG. 21 is a closed loop arrangement using a temperature sensor as a feedback element.

The battery 110, coil 106 and switch 118 are provided as in the embodiment of FIG. 20. The active terminals of the first section 118a of the switch 118 are connected to the collector of an NPN power transistor 126 which functions as a current regulator, and the emitter of the transistor 126 is connected through the coil 106 to the negative terminal of the battery 110.

Resistors 128 and 130 are connected between the base of the transistor 126 and the active terminals of the second section 118b of the switch 118. A temperature sensing element, illustrated as being a thermistor 132, is connected between the active terminals of the first section 118a of the switch 118 and the input terminal of the second section 118b of the switch 118.

In the center or inactive position of the switch 118, the battery 110 is disconnected from the coil 106. In one active position of the switch 118, the thermistor 132 is connected in series with the resistor 128 between the battery 110 and the base of the transistor 126. In the other active position of the switch 118, the thermistor 132 is connected in series with the resistor 130 between the battery 110 and the base of the transistor 126. The values of the resistors 128 and 130 are selected to produce normal and elevated temperature readings on the thermometer 100 respectively.

The thermistor 132 has a resistance value that increases with temperature. Assuming that the resistor 128 is selected to produce a normal temperature reading of 98.6° F., the combined resistance of the resistor 128 and thermistor 132 is such that the current flowing therethrough to the base of the transistor 126 is sufficient to turn on the transistor 126 and supply current therethrough from the battery 110 to the coil 106 as long as the temperature is below 98.6° F.

When the temperature of the thermistor 126 reaches a value corresponding to 98.6° F. on the thermometer 100, the combined resistance is such that the base current to the transistor 126 is insufficient to turn on the transistor 126, and current flow to the coil 106 is interrupted. When the temperature drops below the value corresponding to 98.6° F., the resistance of the thermistor 132 drops and the transistor 126 is turned on again.

In this manner, current is applied to the coil 106 to heat the core 104 as long as the temperature reading on the thermometer is below 98.6° F., and turned off when the temperature reading exceeds this value. The temperature cycles slightly above and below 98.6° F., thereby producing a substantially constant temperature reading to represent the normal condition.

The elevated temperature reading is produced in an essentially similar manner, with the value of the resistor 130 being selected to produce an elevated temperature reading of, for example, 103.2° F. on the thermometer 100.

Figure 22:
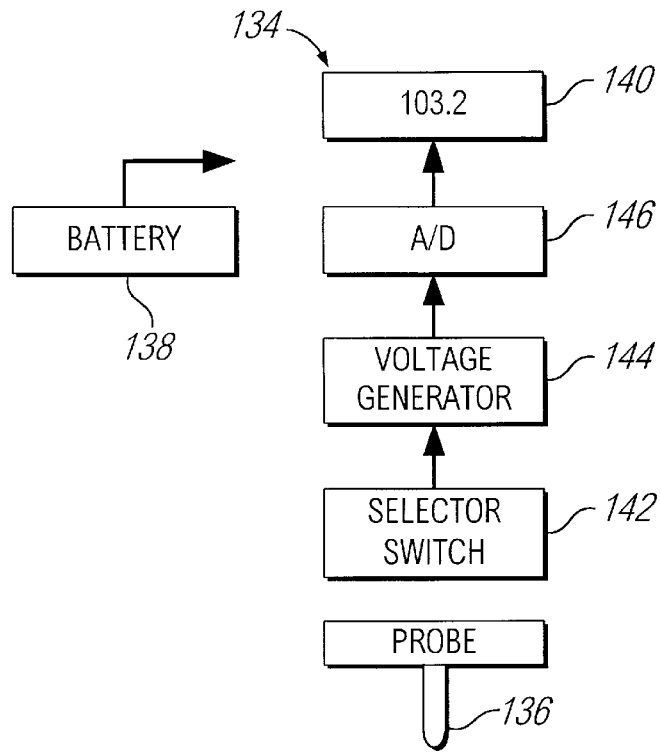
FIG. 22 is a block diagram illustrating a dummy digital thermometer for simulating elevated temperature measurement.

FIG. 22 illustrates a dummy digital thermometer 134 for simulating normal and elevated temperatures without a heater provided in the doll 10. The thermometer 134 comprises a probe 136 which can be inserted into an orifice (mouth or anus) of the body 12 of the doll 10, or can be held in contact with a skin surface such as underneath an armpit. In the thermometer 134, the probe 136 is a dummy component which is not connected to any functioning element of the thermometer 134.

The thermometer 134 further includes a battery 138 for providing electrical power, and a liquid crystal or other digital display 140 for indicating a temperature reading. A selector switch 142 is connected to control a voltage generator 144 which applies a voltage to an analog to digital (A/D) converter 146. The converter 146 produces a digital signal corresponding to the voltage which is applied to the display 140 to generate a temperature reading.

The switch 142 and voltage generator 144 are configured to produce a first voltage which results in a digital reading of 98.6° F. on the display 140 when the switch 142 is in a first active position, and a reading of, for example, 103.2° F. when the switch 142 is in a second active position. The switch 142 further has a center inactive position in which the battery 138 is disconnected from the functional elements of the thermometer 134.

Figure 23:
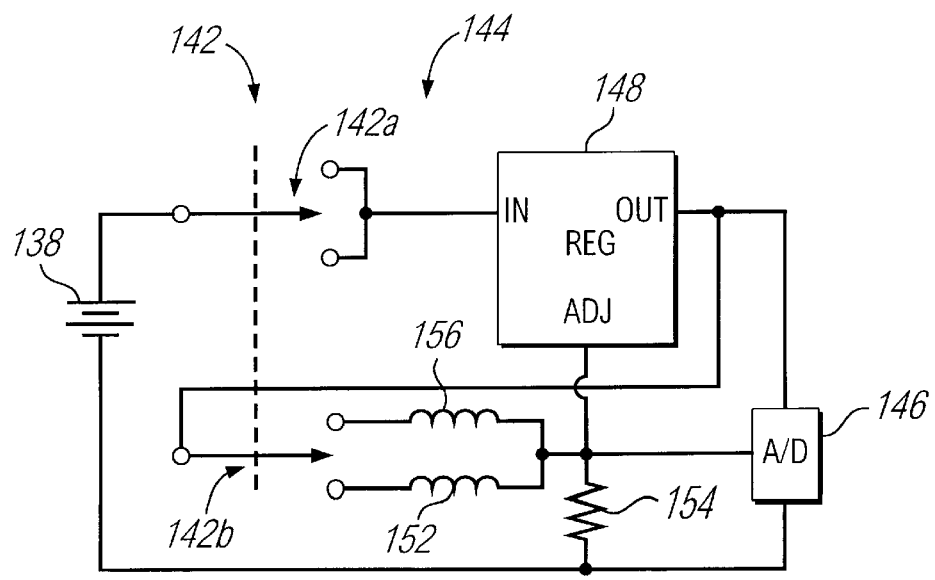
FIG. 23 is an electrical schematic diagram illustrating a voltage generator of the thermometer of FIG. 22.

The voltage generator 144 is illustrated in FIG. 23, and comprises a voltage regulator 148, preferably an LM317 device, which is connected to function in a conventional manner as a voltage regulator. The switch 142 is a tandem, three position unit having first and second sections 142a and 142b as described above with reference to FIGS. 20 and 21.

The A/D converter 146 is connected between the output terminal OUT of the regulator 148 and the negative terminal of the battery 138. A resistor 154 is connected between the adjustment terminal ADJ of the regulator 148 and the negative terminal of the battery 138. Resistors 150 and 152 are selectively connected in series with the resistor 154 by the second section 142b of the switch 142 in the two active positions thereof.

A voltage divider is formed by the resistor 154 and either the resistor 150 or the resistor 152 between the output terminal OUT of the regulator 148 and the negative terminal of the battery 138, with the center tap of the voltage divider being connected to the terminal ADJ of the regulator 148.

In this manner, the regulator 148 applies one of two voltages to the A/D converter 146 which depend on the values of the resistors 150, 152 and 154. The values are selected so that the voltages will produce readings on the display 140 representing the normal and elevated temperatures respectively as described above.

Figure 24:
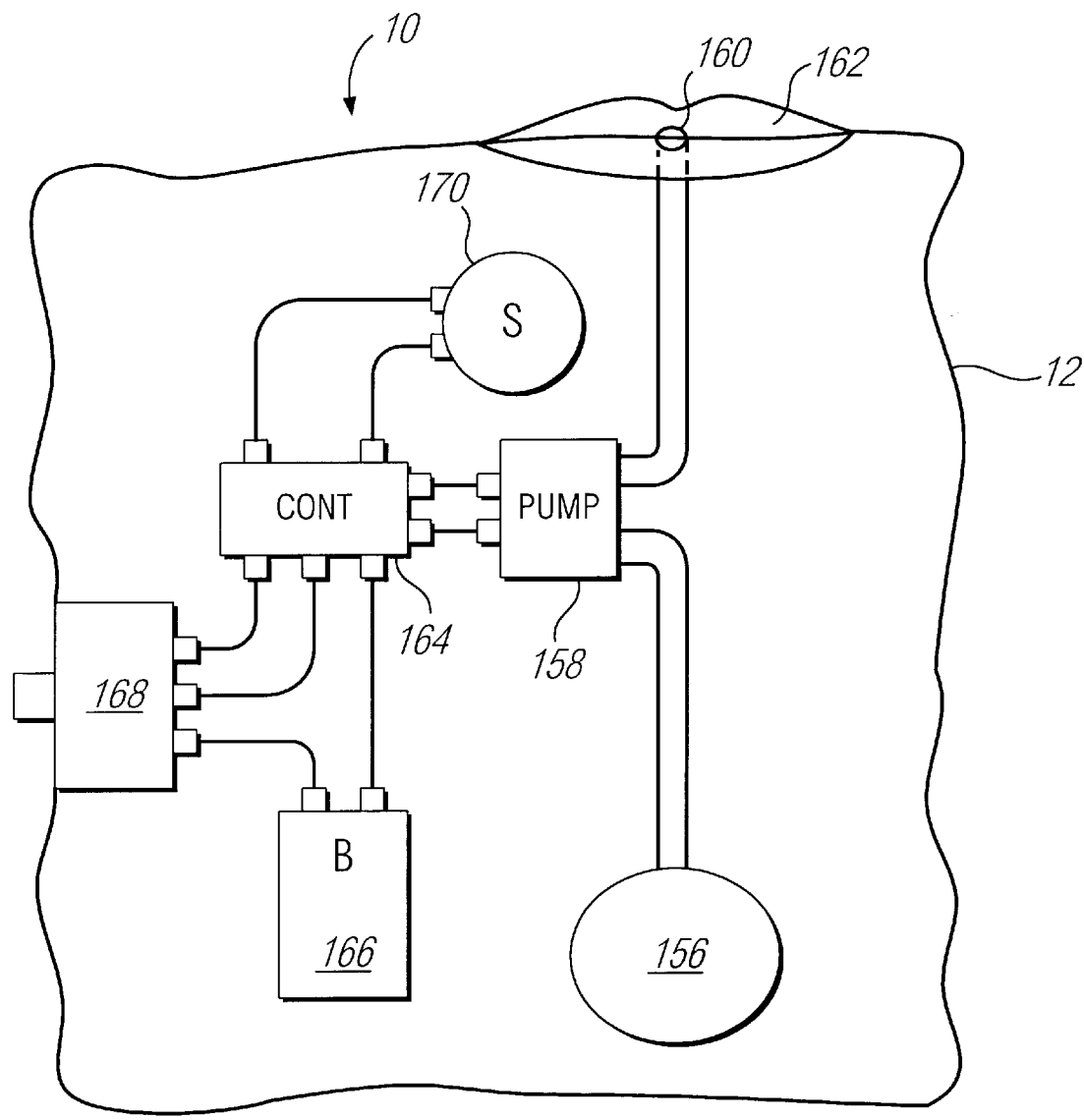
FIG. 24 is a diagram illustrating an arrangement for simulating labored breathing and/or coughing.

FIG. 24 illustrates an arrangement for simulating normal and abnormal breathing. Labored breathing and/or coughing are signs or symptoms of sickle cell disease.

The arrangement of FIG. 24 includes a flexible bag 156 which simulates a lung and is provided in the body 12 of the doll 10 and connected through a pump 148 to an orifice 160 at the doll's mouth 162. The pump 158 is controlled by an integrated circuit controller chip 164 that is powered by a battery 166 via a selector switch 168.

In one active position of the switch 168, the controller 164 controls the pump 158 to alternately pump air into and out of the bag 156 through the orifice 160 at a rate that simulates normal breathing. Preferably, the bag 156 moves the ribcage 14 up and down to produce a visual simulation of breathing.

In the other active position of the switch 168, the controller 164 controls the pump to pump air into and out of the bag 156 in a manner that simulates labored breathing and/or coughing. The controller 164 preferably includes a small microcomputer and memory module that can be programmed to control the pump 158 in the manner desired.

Further illustrated in FIG. 24 is a speaker 170 which is controlled by the controller 164 to produce sounds. The sounds can be normal and labored breathing sounds, coughing sounds, and/or any other desired sounds. The controller 164 in this case further includes an audio synthesizer module for generating and applying the sounds to the speaker 170.

The present invention further includes a method for instruction of disease clinical observations using a doll as described above. The method comprises the steps of:

(a) manipulating the actuator to cause the organ to simulate a normal condition;

(b) instructing a person as to the attributes of the normal condition;

(c) manipulating the actuator to cause the organ to simulate a diseased condition resulting from the disease; and (d). instructing the person as to the attributes of the diseased condition as compared to the normal condition.

Steps (b) and (d) need not be performed verbally by a live instructor. These steps can be performed using pre-recorded written, audio and/or video teaching materials such as textbooks, video tapes, audio tapes, and interactive CD-ROMs.

In summary, the present invention provides a doll for the instruction of sickle cell disease clinical observations, including devices for simulating the differences between normal organs, and organs which are physically altered by sickle cell disease and written material.

The devices simulate the normal and diseased conditions so that the differences can be clearly seen and/or felt. The doll is used to teach parents and others to recognize the signs or symptoms of sickle cell disease so that they may seek medical care for their children before they become more acutely ill.

Various modifications will become possible for those skilled in the art after receiving the teachings of the present disclosure without departing from the scope thereof. For example, it is within the scope of the invention to produce sounds using mechanical means that can be linked to the bag 156 or other moving element, for example, a whistle or other sound generator provided at the orifice 160 as illustrated in FIG. 24.

What is claimed is:

1. A doll for the instruction of clinical observations of a disease, comprising:
 a human shaped body;
 a simulated organ supported by the body; and
 an actuator for selectively causing the organ to simulate a normal condition, or a diseased condition resulting from the disease, in which:
  the organ comprises an eye;
  the eye has a first surface that represents said normal condition, and a second surface that represents said diseased condition; and
  the actuator is configured to move the eye so that the first surface or the second surface is selectively exposed.

2. A doll as in claim 1, in which the actuator comprises a motor for rotating the eye.

3. A doll as in claim 1, in which the actuator comprises a mechanical linkage for rotating the eye.

4. A doll as in claim 1, in which the actuator comprises a weight which causes the eye to maintain a vertical orientation while the body is rotated thereabout.

5. A doll as in claim 4, in which the second surface is displaced from the first surface by 90°.

6. A doll for the instruction of clinical observations of a disease, comprising:
 a human shaped body;
 a simulated organ supported by the body; and
 an actuator for selectively causing the organ to simulate a normal condition, or a diseased condition resulting from the disease, in which:
  the organ comprises an eye;
  the eye comprises an optical display which has a first state that represents said normal condition, and a second state that represents said diseased condition; and
  the actuator is configured to selectively switch between the first state and the second state.

7. A doll for the instruction of clinical observations of a disease, comprising:
 a human shaped body;
 a simulated organ supported by the body; and
 an actuator for selectively causing the organ to simulate a normal condition, or a diseased condition resulting from the disease, in which:
  the organ comprises an eye; and
  the eye has a thermographic pattern formed thereon so as to have a first appearance that represents said normal condition without heat applied thereto, and a second appearance that represents said diseased condition with heat applied thereto.

8. A doll for the instruction of clinical observations of a disease, comprising:

a human shaped body;

a simulated organ supported by the body; and an actuator for selectively causing the organ to simulate a normal condition, or a diseased condition resulting from the disease, in which:
the organ comprises an eye; and
the eye has a hydrographic pattern formed thereon so as to have a first appearance that represents said normal condition without liquid applied thereto, and a second appearance that represents said diseased condition with liquid applied thereto.

9. A doll for the instruction of clinical observations of a disease, comprising:

a human shaped body;

a simulated organ supported by the body; and an actuator for selectively causing the organ to simulate a normal condition, or a diseased condition resulting from the disease, in which:
the organ comprises a spleen;
the spleen comprises an inflatable bag; and
the actuator is configured to selectively inflate the bag to a first state that represents said normal condition, and a second state that represents said diseased condition.

10. A doll as in claim 9, in which the actuator comprises a tube which leads from the bag external of the body for manually inflating the bag.

11. A doll as in claim 9, in which the actuator comprises a pump.

12. A doll as in claim 9, further comprising a simulated ribcage supported by the body, in which:

the bag is configured such that in its first state it is relatively deflated and substantially covered by the ribcage, and in its second state it is relatively inflated and protrudes below the ribcage.

13. A doll as in claim 9, further comprising:

a simulated ribcage supported by the body; and a simulated skin surface supported by the body below the ribcage, in which:
the bag is disposed beneath the skin surface; and
the actuator is configured to selectively deflate the bag so that it extends relatively far from the skin surface to represent said normal condition, and inflate the bag so that it extends relatively close to the skin surface to represent said diseased condition.

14. A doll for the instruction of clinical observations of a disease comprising:

a human shaped body;

a simulated organ supported by the body; and an actuator for selectively causing the organ to simulate a normal condition, or a diseased condition resulting from the disease, in which:

the organ comprises a spleen; and the doll further comprises:
a simulated ribcage supported by the body; and
a simulated skin surface supported by the body below the ribcage, in which:
the spleen is disposed beneath the skin surface; and
the actuator is configured to selectively move the spleen between a first position in which it extends relatively far from the skin surface to represent said normal condition, and a second position in which it extends relatively close to the skin surface to represent said diseased condition.

15. A doll as in claim 14, in which the actuator comprises a linear motor.

16. A doll as in claim 14, in which the actuator comprises a mechanical linkage.

17. A doll for the instruction of clinical observations of a disease, comprising:

a human shaped body;

a simulated organ supported by the body; and an actuator for selectively causing the organ to simulate a normal condition, or a diseased condition resulting from the disease, in which:

the organ comprises a spleen; and the doll further comprises a simulated ribcage supported by the body, in which:
the actuator is configured to selectively move the spleen between a first position in which it is substantially covered by the ribcage to represent said normal condition, and a second position in which it protrudes below the ribcage to represent said diseased condition.

18. A doll as in claim 9, in which the disease is sickle cell disease.

19. A doll as in claim 9, in which the disease is a red-cell borne disease.

20. A doll as in claim 9, in which the disease is malaria.

21. A doll as in claim 9, in which the disease is thalassemia.

22. A doll for the instruction of clinical observations of a disease, comprising:

a human shaped body;

a simulated organ supported by the body; and an actuator for selectively causing the organ to simulate a normal condition, or a diseased condition resulting from the disease, in which:

the organ comprises a surface from which body temperature is measured; and the actuator comprises a first dummy thermometer which indicates a normal body temperature to represent said normal condition, and a second dummy thermometer which indicates an elevated body temperature to represent said diseased condition.

* * * * *